United States Patent [19]

Yamada et al.

[11] 4,183,976

[45] Jan. 15, 1980

[54] PROCESS OF PRODUCING A MAGNETIC RECORDING ELEMENT

[75] Inventors: Yasuyuki Yamada; Tatsuji Kitamoto, both of Odawara, Japan

[73] Assignee: Fuji Photo Film Co., Ltd., Ashigara, Japan

[21] Appl. No.: 870,146

[22] Filed: Jan. 17, 1978

Related U.S. Application Data

[63] Continuation-in-part of Ser. No. 728,081, Sep. 30, 1976, abandoned.

[30] Foreign Application Priority Data

Oct. 1, 1975 [JP] Japan ................................. 50-118541

[51] Int. Cl.² ............................................. H01F 10/00
[52] U.S. Cl. ..................................... 427/130; 427/131; 427/173; 427/378
[58] Field of Search ..................... 427/131, 128–130, 427/132, 48, 378; 428/900

[56] References Cited

U.S. PATENT DOCUMENTS

3,547,693  12/1970  Huguenard ........................... 428/425

FOREIGN PATENT DOCUMENTS

669064  8/1963  Canada .

*Primary Examiner*—Bernard D. Pianalto
*Attorney, Agent, or Firm*—Sughrue, Rothwell, Mion, Zinn and Macpeak

[57] ABSTRACT

A process of producing a magnetic recording element comprising a non-magnetic support having provided thereon a subbing layer and further having provided thereon a magnetic layer comprising a ferromagnetic powder and a binder, in which the non-magnetic support is a biaxially stretched polyester and the subbing layer is formed by coating a coating solution having a solids concentration of about 0.8 to about 5 wt% comprising an amorphous linear saturated polyester resin containing an aromatic dicarboxylic acid, 10 to 50 wt% of a vinylidene chloride addition polymerizable nitrile copolymer based on the polyester resin and an organic solvent mainly composed of methyl ethyl ketone, which comprises coating the subbing solution at a temperature of about 100° C. or below to provide a dry thickness of about 0.03 to about 2.0 μm, drying the coated layer and then coating the magnetic recording layer thereon.

7 Claims, No Drawings

4,183,976

PROCESS OF PRODUCING A MAGNETIC RECORDING ELEMENT

CROSS-REFERENCE TO RELATED APPLICATION

This application is a continuation-in-part of Ser. No. 728,081, filed Sept. 30, 1976 and now abandoned.

BACKGROUND OF THE INVENTION

1. Field of the Invention

The present invention relates to a process of producing a magnetic recording element such as a video tape, an audio tape, a tape for an electronic computer, a magnetic sheet, an instrumentation tape, etc., and, in particular, to a process of producing a magnetic recording element having provided thereon a subbing layer which provides excellent adhesion of the magnetic layer to the support and which does not cause blocking at the edges of a wide roll during production.

2. Description of the Prior Art

Most supports of recently developed magnetic recording elements comprise polyethylene terephthalate. Polyethylene terephthalate has strong resistance to organic solvents and excellent mechanical strength because of biaxial stretching and crystallization to a high degree. However, it is required in magnetic recording elements obtained by coating a dispersion of ferromagnetic particles in a binder onto such a support that the support strongly adhere to the magnetic layer. For this purpose, various devices have been made.

With respect to subbing methods, there are known methods as are described in Japanese Patent Publications 22071/72 and 10243/74, Japanese Patent Applications (OPI) 46406/74, 46407/74, 32905/75, 32906/75 and 32907/75, etc. However, while these methods are good at some points they are not good at other points and do not provide satisfactory subbing agents.

SUMMARY OF THE INVENTION

It is, therefore, one object of the present invention to provide a novel process of producing magnetic recording elements which provide effective adherence to polyesters, particularly to polyethylene terephthalate.

That is, the present invention is directed to a process of producing a magnetic recording element comprising a non-magnetic support having provided thereon a subbing layer having further provided thereon a magnetic layer comrising a ferromagnetic powder and a binder, in which the non-magnetic support is a biaxially stretched polyester and the subbing layer is formed by coating at a temperature below about 100° C., to a dry thickness of about 0.03 to about 2.0 $\mu$m a subbing solution of a concentration of about 0.8 to about 5 wt% as solid components obtained by dissolving an amorphous linear saturated polyester resin containing an aromatic dicarboxylic acid and 10 to 50 wt% of a vinylidene chloride addition polymerizable nitrile copolymer in an organic solvent mainly composed of methyl ethyl ketone, drying the coated layer and then coating thereon the magnetic recording layer.

DETAILED DESCRIPTION OF THE INVENTION

As the amorphous linear saturated polyester used in the present invention, there are polyesters which have an average molecular weight of from about 10,000 to about 30,000, a solubility parameter of from 8.9 to 11.1, a tensile breaking strength of from about 20 to about 1000 kg/cm$^2$, a softening point of from about 100° to about 200° C. and a melting point of from about 120° to about 250° C.

Such polyesters are amorphous linear saturated polyesters comprising as main components an aromatic dicarboxylic acid and a glycol. Preferred aromatic dicarboxylic acids are those having 8 to 18 carbon atoms, as exemplified by terephthalic acid, isophthalic acid, p-$\beta$-oxyethoxybenzoic acid, diphenylsulfonecarboxylic acid, diphenoxyethane dicarboxylic acid, 5-sodium sulfoisophthalic acid, diphenylene dicarboxylic acid, 2,6-naphthalene dicarboxylic acid, etc. Preferred glycols are those having 2 to 10 carbon atoms, as exemplified by ethylene glycol, propylene glycol, butanediol, neopentylene glycol, 1,4-cyclohexanediol, 1,4-cyclohexanedimethanol, 1,4-dihydroxybenzene, bisphenol A, diethylene glycol, polyethylene glycol, etc. A suitable molar ratio of the aromatic dicarboxylic acid to the glycol can range from 1:2 to 1:3. The other additives can be present in an amount of about 5 mole % or less to the above two components and can be selected from aliphatic saturated dicarboxylic acids, aliphatic unsaturated dicarboxylic acids and oxydicarboxylic acids, preferably dicarboxylic acids having 13 or less carbon atoms. For example, suitable materials include oxalic acid, malonic acid, succinic acid, glutaric acid, adipic acid, pimelic acid, suberic acid, azelaic acid, sebacic acid, maleic acid, fumaric acid, 3-hydroxy-1,5-pentane dicarboxylic acid, 3-hydroxypropoxy dicarboxylic acid, hydroxy butylidene malonic acid, etc.

Methods of synthesizing these polyesters are described in British Patent 578,079, P. J. Flory, *Journal of the American Chemical Society*, 61, 3334 (1939) and 62, 2261 (1940), R. W. Doak and H. N. Cambell, *Journal of the Polymer Science*, 18, 215 (1955), etc.

The term "vinylidene chloride-addition polymerizable nitrile copolymer" as used in the present specification and claims means a copolymer of vinylidene chloride and acrylonitrile or methacrylonitrile. It is preferred that the softening point thereof range from about 120° to 150° C. and the nitrogen content thereof range from about 1 to 6%. The copolymerization ratio of the addition polymerizable nitrile can be determined by the aforementioned nitrogen content and the molecular weight of the copolymer can be predicted by the aforementioned softening point to some extent. A preferred molecular weight ranges from about 8,000 to 40,000.

Methods of synthesizing these copolymers are described in Japanese Patent Publications 9495/75 and 7791/57, U.S. Pat. Nos. 2,906,721, 2,956,047, 3,002,956, 3,009,207, 3,018,197, 3,039,986, 3,053,806, 3,053,870, 3,058,846, and 3,058,949, British Pat. Nos. 928,114 and 952,075, German Pat. Nos. 1,102,400 and 1,116,901, etc.

The composition of the subbing layer in accordance with the present invention is preferably such that the vinylidene chloride-addition polymerizable nitrile copolymer is present in an amount of about 3 to about 60 wt.%, preferably 10 to 50 wt%, based on the amorphous linear polyester resin.

The subbing layer of the present invention is coated onto a non-magnetic support using an organic solvent, followed by drying. The dry thickness of the subbing layer is preferably about 0.03 to about 2.0 $\mu$m, more preferably 0.2 to 1.5 $\mu$m.

The adhesive strength required in the present invention is such that the adhesive strength can be effectively maintained in the atmosphere at temperatures of from −20° to 70° C. and at a humidity of 80% RH, which means a tensile strength of greater than about 100 g/cm² at 30° C. and greater than about 20 g/cm² at −20° C. to 0° C., at a velocity of 20 cm/min. or less, preferably 10 to 20 cm/min., using a TOM tensile testing machine.

In addition, it is preferred that chlorine type organic solvents not be used in the present invention, that the drying rate be rapid without using water in the present invention since water evaporates more slowly, and that no harmful substance be released upon heating or the like in the present invention.

Further, the subbing layer in accordance with the present invention may, if desired, contain additives to a magnetic layer as will be later described, such as a dispersing agent, a lubricating agent, an abrasive, an antistatic agent, etc. It is preferred that the total of these additives be added in an amount of less than 10 wt% based on the subbing layer.

Suitable examples of organic solvents which can be used upon coating include methyl ethyl ketone which is a main component and, in addition, other compatible ketone type solvents such as acetone, methyl isobutyl ketone, cyclohexanone, etc,; ester type solvents such as methyl acetate, ethyl acetate, butyl acetate, ethyl lactate, glycol monoethyl ether acetate, etc.; ether and glycol ether type solvents such as ether, glycol dimethyl ether, glycol monoethyl ether, dioxane, etc.; tar type (aromatic hydrocarbon) solvents such as benzene, toluene, xylene, etc.

It is preferred that the aforementioned organic solvent be used with the mixing ratio of methyl ethyl ketone being about 50 to about 100 wt%, more preferably 80 to 95 wt%. About 10 to about 50 parts by weight of the copolymer based on 100 parts by weight of the polyester resin are mixed, and dissolved in the organic solvent at a concentration of the above two components of about 0.8 to about 5% by weight, as a coating solution for the subbing layer.

As methods of coating the subbing layer of the present invention onto a non-magnetic support, there are utilized air doctor coating, blade coating, air knife coating, squeeze coating, immersion coating, reverse roll coating, transfer roll coating, gravure coating, kiss coating, cast coating, spray coating, etc. It is also possible to use other methods, the details of which are described in *Coating Kogaku* (Coating Technology), pages 253–277., Mar. 20, 1971, published by Asakura Shoten, Japan.

Drying conditions after coating the subbing layer are performed at temperatures of less than about 100° C., preferably 70° to 100° C., more preferably 80° to 90° C., using an air flow of about 1 to about 5 kl/m²/sec, preferably 2 to 3 kl/m²/sec, and in a period of time of about 2 to about 10 seconds.

As the non-magnetic support, polyesters such as polyethylene terephthalate, polyethylene-2,6-naphthalate and polybutylene terephthalate are employed as materials thereof. A polyester film subjected to biaxial stretching is preferred, with the stretching degree in the length direction being about 3 to about 6 times and with the stretching degree in the width direction being about 1.2 to about 4 times. A preferred ratio of the stretching in the length to stretching in the width direction is a stretching ratio more than 1.0.

The thickness of these non-magnetic supports is about 3 to about 100 μm in the case of a film, a tape or a sheet, more preferably 5 to 50 μm, and in case of a disk or card a thickness of about 0.5 to 10 mm in best used. In the case of a drum, the shape is rendered cylinder like and determined depending upon the recorder to be used.

The subbing layer in accordance with the present invention is particularly effective when the non-magnetic support is in the shape of a film, a tape or a sheet.

The aforementioned non-magnetic support may have a back coating on the surface opposite to the magnetic layer, for the purpose of static prevention, print-through prevention, or the like.

The useful back coating procedures are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,685 and 3,761,311, etc.

Processes of producing a magnetic material used in forming a magnetic recording layer of the present invention are described in Japanese Patent Publications 15/60, 26794/64, 186/68, 28043/72, 28045/72, 28046/72, 28048/72, 31445/72, 11162/73, 21331/73 and 33583/73, Soviet Pat. No. 308,033, etc. in detail. The magnetic materials described in the above patents mainly comprise ferromagnetic powders, a binder and a coating solvent, and may additionally optionally contain additives such as a dispersing agent, a lubricating agent, an abrasive, an antistatic agent, etc.

Examples of ferromagnetic powders which can be used in accordance with the present invention include known ferromagnetic powders such as $\gamma$-$Fe_2O_3$, $Fe_3O_4$, Co-containing $Fe_3O_4$, Bertholide compounds of $\gamma$-$Fe_2O_3$ and $Fe_3O_4$ (of the formula $FeO_x$, $1.33<x<1.50$), Bertholide compounds of Co-containing $\gamma$-$Fe_2O_3$ and $Fe_3O_4$ (of the formula $FeO_x$, $1.33<x<1.50$), $CrO_2$, Co-Ni alloys, Co-Ni-P alloys, Co-Ni-B alloys, Co-Ni-Fe alloys, Co-Ni-Fe-P alloys, Co-Ni-Fe-B alloys, Co-Ni-Zn alloys, Co-Ni-Cr-P alloys, Co-Ni-Cr-B alloys, Fe-Mn-Zn alloys, Fe-Co-Ni-Cr alloys, etc., as are specifically described in Japanese Patent Publications 5009/64, 10307/64, 14090/69, 18372/70, 22513/72, 22062/72, 28466/71, 38755/71, 4286/72, 12422/72, 17284/72, 18509/72, 18573/72, 39120/73 and 39639/73, U.S. Pat. Nos. 3,026,215, 3,031,341, 3,100,194, 3,242,055 and 3,389,014, British Pat. Nos. 752,659, 782,762 and 1,007,323, French Pat. No. 1,107,654, German Patent Application (OLS) 1,281,334, etc.

These ferromagnetic powders have a particle size of about 0.2 to about 2 microns (length) preferably less than 1.5 micron and a length/width ratio of about 1/1 to about 20/1, preferably more than 5/1.

Examples of binders which can be used in the present invention include a thermoplastic resin, a thermosetting resin or a reactve resin (all of which are known and are conventional) or a mixture thereof.

Preferred thermoplastic resins include those having a softening point of about 150° C. or less and an average molecular weight of from about 10,000 to about 200,000, and a polymerization degree of about 200 to about 2000, examples of which include a vinyl chloride-vinyl acetate copolymer, a vinyl chloride-vinylidene copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester-vinylidene chloride copolymer, a methacrylic acid ester-styrene copolymer, a urethane elastomer, polyvinyl fluoride, a vinylidene chloride-acrylonitrile copolymer, a butadiene-acrylonitrile copolymer, a polyamide resin, a polyvinyl butyral, a cellulose derivative (e.g., cellulose acetate butyrate, cellulose diacetate, cellulose triacetate, cellulose propionate, nitrocellulose, etc.), a styrene-butadiene copolymer, a polyester resin, a chlorovinyl ether-acrylate copolymer, various synthetic rubber type thermoplastic resins mixtures thereof, etc.

Examples of these resins are styrene-butadiene rubber, acrylonitrile-butadiene rubber, chloroprene, rubber, etc. and they are described in Japanese Patent Publications 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, 27886/73 and 3121/74, U.S. Pat. Nos. 3,114,352, 3,419,420, 3,499,789 and 3,718,887, etc.

Preferred thermosetting resins or reactive resins have a molecular weight of less than about 200,000 in the state of a coating solution, but the molecular weight thereof becomes essentially infinite due to reactions such as condensation, addition, etc., after coating and drying. Further, of these resins, resins which do not soften or melt until they are heat decomposed are preferred. Specific examples of these resins are, for example, a phenol resin, an epoxy resin, a polyurethane setting resin, a urea resin, a melamine resin, an alkyd resin, a silicone resin, an acryl type reactive resin, an epoxypolyamide resin, a mixture of a high molecular weight polyester resin and an isocyanate prepolymer, a mixture of a methacrylate copolymer and a diisocyanate prepolymer, a mixture of a polyester polyol and a polyisocyanate, a ureaformaldehyde resin, a mixture of a low molecular weight glycol/a high molecular weight diol/triphenylmethane triisocyanate, a polyamine resin, mixtures thereof, etc.

Details on these resins are given in Japanese Patent Publications 8103/64, 9779/65, 7192/66, 8016/66, 14275/66, 18179/67, 12081/68, 28023/69, 14501/70, 24902/70, 13103/71, 22065/72, 22073/72, 28073/72, 28045/72, 28048/72 and 29822/72, U.S. Pat. Nos. 3,144,353, 3,320,090, 3,437,510, 3,597,273, 3,781,210 and 3,781,211, etc.

These binders can be used singly or in combination, and may contain additives. The binders are used within a range such that the mixing ratio of ferromagnetic powder(s) to the binder is about 10 to about 200 parts by weight, preferably 10 to 100 parts by weight, of the binder per 100 parts by weight of the ferromagnetic powder(s) as a weight ratio.

To the magnetic recording layer, a dispersing agent, a smoothening agent, an abrasive, an antistatic agent, etc., can be added, in addition to the aforementioned binder and ferromagnetic powders.

Examples of dispersing agents are a fatty acid having 12 to 18 carbon atoms ($R_1COOH$ wherein $R_1$ is an alkyl or alkenyl group having 11 to 17 carbon atoms) such as caprylic acid, capric acid, lauric acid, myristic acid, palmitic acid, stearic acid, oleic acid, elaidic acid, linolic acid, linoleic acid, stearolic acid, etc.; metallic soaps consisting of alkali metal (Li,Na, K, etc.) salts or alkaline earth metal (Mg, Ca, Ba) salts of the aforementioned fatty acids; fluorine-containing compounds of the aforementioned fatty acid esters (e.g., $\begin{array}{c} C_8F_{17}OOC_4-SO_3Na); \\ | \\ C_8F_{17}OOCH_2 \end{array}$ lecithin; trialkylpolyolefin oxy quaternary ammonium salts (wherein the alkyl group has 1 to 5 carbon atoms and the olefin is ethylene, propylene, etc.), etc. In addition, a higher alcohol having 12 or more carbon atoms such as lauryl alcohol, tridecyl alcohol, myristyl alcohol, pentadecyl alcohol, cetyl alcohol, stearyl alcohol, oleyl alcohol, linoleyl alcohol, and sulfonic acid esters of these higher slcohols, such as sodium stearyl alcohol sulfate ($C_{18}H_{32}OSO_3Na$), etc., can also be used. These dispersing agents are employed by adding within a range of from about 0.5 to about 20 parts by weight per 100 parts of the binder. Details are given in Japanese Patent Publications 28369/64, 17945/69, 7441/73, 15001/73, 15002/73, 16363/73 and 4121/75, U.S. Pat. Nos. 3,387,993 and 3,470,021, etc.

Examples of lubricants which can be used include a silicone oil such as a dialkyl polysiloxane (wherein the alkyl group has 1 to 5 carbon atoms), a dialkoxy polysiloxane (wherein the alkoxy group has 1 to 4 carbon atoms), a monoalkyl monoalkoxy polysiloxane (wherein the alkyl group has 1 to 5 carbon atoms and the alkoxy group has 1 to 4 carbon atoms), phenyl polysiloxane, a fluoroalkyl polysiloxane (wherein the alkyl group has 1 to 5 carbon atoms), etc.; electroconductive powders such as graphite, etc.; inorganic powders such such as molybdenum disulfide, tungsten disulfide, etc.; plastic powders such as polypropylene, a polyethylene-vinyl chloride copolymer, polytetrafluoroethylene, etc.; an α-olefin polymer; unsaturated aliphatic hydrocarbons liquid at normal temperature (compounds having an α-olefinic double bond attached to the carbon at the terminal thereof, and containing about 15 to about 20 carbon atoms); a fatty acid ester comprising a monobasic fatty acid having 12 to 30 carbon atoms and a monovalent alcohol having 3 to 12 carbon atoms; etc. These lubricants are added in an amount of about 0.2 to about 20 parts by weight per 100 parts by weight of binder. These lubricants are described in detail in Japanese Patent Publications 23889/68, 40461/71, 15621/72, 18482/72, 28043/72, 30207/72, 32001/72, 7442/73, 14247/74 and 5042/75, U.S. Pat. Nos. 3,470,021, 3,492,235, 3,497,411, 3,523,086, 3,625,760, 3,630,772, 3,634,253, 3,542,539 and 3,687,725, *IBM Technical Disclosure Bulletin,* Vol. 9, No. 7 page 779 (December 1966), *ELEKTRONIK,* 1961, No. 12, page 380, etc.

As abrasives, there are used those which are generally employed in this art which include fused alumina, silicon carbide, chromium oxide, corundum, artificial corundum, diamond, artificial diamond, garnet, emery (main components: corundum and magnetite), etc. The abrasives have an average particle size of about 0.05 to about 5μ, preferably 0.1 to 2μ. These abrasives are added in an amount of about 0.5 to about 20 parts by weight per 100 parts by weight of the binder. Details thereon are given in Japanese Patent Publications 18572/72, 15003/73 and 15004/73 (U.S. Pat. No. 3,617,378), 39402/74 and 9402/75, U.S. Pat. Nos. 3,007,807, 3,041,196, 3,293,066, 3,630,910 and 3,687,725, British Pat. No. 1,145,349, German Pat. Nos. 853,211 and 1,101,000, etc.

Examples of antistatic agents which can be used include electroconductive powders such as carbon black, carbon black graft polymers, e.g., a reaction product of a copolymer of carbon black and an acrylate, methacrylate, vinyl chloride or styrene polymer which is prepared by graft polymerization, etc.; natural surface active agents such as saponin, etc.; nonionic surface active agents such as alkylene oxide type, glycerine type, glycidol type, etc. surface active agents; cationic surface active agents such as higher alkylamines, quaternary ammonium salts, pyridine or other heterocyclic ring compounds, phosphonium or sulfonium, etc. surface active agents; anionic surface active agents containing an acid group such as a carboxylic acid, sulfonic acid, phosphoric acid, sulfuric acid ester, etc., group, amphoteric surface active agents such as amino acid, aminosulfonic acid, sulfuric acid or phosphoric acid esters of aminoalcohols, etc. A suitable amount of the electroconductive powder is at least about 10% by weight, preferably 0.1 to 8% by weight, and of the surface active agent is at least about 10% by weight, preferably 0.1 to 7% by weight, each based on the weight of ferromagnetic powder.

Some surface active agents which can also be used as antistatic agents are described in Japanese Patent Publications 22726/71, 24881/72, 26882/72, 15440/73 and 26761/73, U.S. Pat. Nos. 2,271,623, 2,240,472, 2,288,226, 2,676,122, 2,676,924, 2,676,975, 2,691,566, 2,727,860, 2,730,498, 2,742,279, 2,739,891, 3,068,101, 3,158,484, 3,201,253, 3,210,191, 3,294,540, 3,415,649, 3,441,413, 3,442,654, 3,475,174 and 3,545,974, German Patent Application (OLS) 1,942,665, British Pat. Nos. 1,077,317 and 1,198,450, Oda Ryohei, *Kaimen Kasseizai no Gosei to sono Oyo* (Synthesis of Surface Active Agents and Their Application), 1964, published by Maki Shoten, A. M. Schwartz & J. W. Perry, *Surface Active Agents*, 1958, published by Interscience Publication Incorporated, J. P. Sisley, *Encyclopedia of Surface Active Agents*, vol. 2, 1964, published by Chemical Publishing Company, *Kaimen Kasseizai Binran* (Handbook of Surface Active Agents), sixth ed., December 20, 1966, published by Sangyo Tosho Kabushiki Kaisha, etc.

These surface active agents may be added singly or in combination. They are used as antistatic agents, but they may also be utilized sometimes for other purposes, for example, for dispersion, improvement of magnetic characteristics, improvement of lubricity or as a coating aid.

The provision of the magnetic recording layer is performed by dissolving the aforementioned composition in an organic solvent and coating the resultant coating solution on the subbing layer of the present invention which is provided on a non-magnetic support.

For kneading (dispersion) of a magnetic coating solution, various kneading machines can be used. For example, there are a two roll mill, a three roll mill, a ball mill, a pebble mill, a trommel, a sand grinder, a Szegvari attritor, a high-speed impeller dispersing machine, a high speed stone mill, a high speed impact mill, a disper, a kneader, a high speed mixer, a homogenizer, a ultrasonic dispersing machine, etc.

Technology regarding kneading (dispersion) is described in T. C. Patton, *Paint Flow and Pigment Dispersion*, 1964, published by John Wiley & Sons, and also described in U.S. Pat. Nos. 2,581,414 and 2,855,156.

Coating of the aforementioned magnetic recording layer onto a subbing layer of the present invention is performed in a conventional manner by e.g., by any of the procedures earlier described for coating the subbing layer.

Examples of organic solvents which can be used for coating are ketone type solvents such as acetone, methyl ethyl ketone, methyl isobutyl ketone, cyclohexanone, etc.; alcohol type solvents such as methanol, ethanol, propanol, butanol, etc.; ester type solvents such as methyl acetate, ethyl acetate, butyl acetate, ethyl lactate, glycol acetate, monoethyl ether, etc.; ether and glycol ether type solvents such as ether, glycol dimethyl ether, glycol monoethyl ether, dioxane, etc.; tar type (aromatic hydrocarbon) solvents such as benzene, toluene, xylene, etc., which can used alone or in combination.

The thus formed magnetic layer is dried, if necessary, after subjecting the ferromagnetic powders in the layer provided on the subbing layer to an orientation. If necessary, a surface smoothening treatment can be performed or the material cut into a desired shape, a magnetic recording element thus being produced. In particular, it has been found that if a surface smoothening treatment of the magnetic recording layer is performed, a magnetic recording element having a smooth surface and excellent abrasion resistance can be obtained.

In this case, the magnetic field for orientation is about 500 to 2000 Gauss (direct current or alternating current), drying is at about 50° to 100° C., preferably 70° to 100° C., more preferably 80° to 90° C. and, during drying, air is blown on the element at an air flow of about 1 to about 5 kl/m$^2$/sec, preferably 2 to 3 kl/m$^2$/sec, with the drying time being about 30 seconds to 10 minutes, preferably 1 to 5 mins.

The direction the orientation of the magnetic material is determined depending upon its use. That is, in the case of a sound tape, a compact video tape, a memory tape, etc., the direction for orientation is parallel to the longitudinal direction of the tape; in the case of a video tape for broadcasting, orientation is performed at an angle of 30° to 90° C. to the longitudinal direction.

Methods for orientation of magnetic powders are also described in the following patents: U.S. Pat. Nos. 1,949,840, 2,796,359, 3,001,891, 3,172,776, 3,416,949, 3,473,960 and 3,681,138 and Japanese Patent Publications 3427/57, 28368/64, 23624/65, 23625/65, 13181/66, 13043/73 and 39722/73, etc.

A surface smoothing treatment can be performed by calendering after drying using a smoothening sheet after coating, etc., as is described in U.S. Pat. Nos. 2,688,567, 2,998,325 and 3,783,023, German Patent Application (OLS) 2,405,222, Japanese Patent Applications (OPI) 53631/74 and 10337/75, etc.

It has been confirmed that the magnetic recording element obtained in accordance with the method of the present invention as explained above has strong adherence between the magnetic recording layer and the polyester support by the provision of the subbing layer, and, further, the present invention provides a method which does not cause blocking at the edge of a wide sheet or tackiness problems upon coating a wide sheet.

The present invention will now be described in more detail with reference to Examples and Comparative Examples hereinbelow. It can easily be understood that components, ratios, the order of operations or the like shown herein can be modified without departing from the spirit and scope of the present invention.

Accordingly, the present invention is not to be limited to the examples hereinbelow.

All parts in the examples and comparative examples below are by weight.

EXAMPLE 1

Onto a polyethylene terephthalate film (22 μm thick) Subbing Solution I having the following formulation was uniformly coated in a 0.4 μm dry thickness.

| Subbing Solution I (concentration: 2 wt % solution) | |
| --- | --- |
| Amorphous Linear Saturated Polyester (terpolymer of isophthalic acid, sebacic acid and ethylene glycol (1:1:4.2 molar ratio) average molecular weight: 17000, intrinsic viscosity (30° C., 0.5% solution of phenol/ tetrachloroethane = 6/4): 0.54) | 70 parts |
| Copolymer of Vinylidene Chloride and Acrylonitrile (nitrogen content: 5.1%, viscosity of solution (25° C., 2 wt % dimethyl formamide solution): 2.2 cp) | 30 parts |
| Solvent Mixture of Methyl Ethyl Ketone and Cyclohexanone (9:1 volume) | 5000 parts |

The coating was dried at 80° C. for 7 seconds in an air flow of 2.5 kl/m²/sec. to form a subbing layer.

Four specimens of the polyethylene terephthalate film having the subbing layer aforementioned were prepared. Onto the subbing layer of each of the specimens, the following four kinds of Magnetic Coating Solutions A, B, C and D were coated, respectively, in a dry thickness of 8 μm. After orientation in a direct current magnetic field of 1500 Gauss and then drying for 3 mins. at 90° to 95° C. in an air flow of 3 kl/m²/sec., the films were slit to a ¼ inch width to obtain magnetic tapes, which were identified as Sample Nos. I-A, I-B, I-C and I-D, respectively.

| Magnetic Coating Solution A | |
| --- | --- |
| Maghemite (γ-Fe₂O₃, Hc = 295 Oe, particle size: 0.03 × 0.03 × 0.5 μm) | 100 parts |
| Vinyl Chloride-Vinyl Acetate Copolymer (copolymerization ratio: 75/25 (wt %), molecular weight:450) | 25 parts |
| Polybutyl Acrylate (molecular weight: about 450) | 5 parts |
| Carbon Black (particle size: about 40 μm) | 7 parts |
| Dimethyl Polysiloxane (degree of polymerization: about 60) | 0.3 part |
| Methyl Ethyl Ketone/Methyl Isobutyl Ketone (1/1 volume) Solvent Mixture | 300 parts |
| Magnetic Coating Solution B | |
| Ferromagnetic Fe-Co-Ni Alloy Powders (Hc = 600 Oe, particle size: 0.03 × 0.03 × 0.3 μm) | 100 parts |
| Polyurethane Resin (reaction product of polyethylene adipate and m-xylylene diisocyanate, (1.2: 1 molar ratio) molecular weight: 130,000) | 15 parts |
| Alkyd Resin (reaction product of glycerine, terephthalic acid and a non-drying oil, (1.2 : 2: 0.5 molar ratio), hydroxyl value:130, oil length: 29%) | 7 parts |
| Polyisocyanate (a 75 wt % butyl acetate solution of the reaction product of 1 mol of trimethylol propane and 3 mols of 2,4-tolylene diisocyanate, tradename "Desmodur L-75", manufactured by Bayer A.G.) | 7 parts |
| Lecithin | 1 parts |
| Trifluoroethylene Chloride | 0.5 part |
| Butyl Acetate | 320 parts |
| Magnetic Coating Solution C | |
| Co-containing Magetite (Hc = 550 Oe, particle size: 0.04 × 0.04 × 0.6 μm) | 100 parts |
| Vinyl Chloride-Vinyl Acetate Copolymer (copolymerization ratio: 75/25 (wt %), polymerization degree:450) | 10 parts |
| Butyl Acrylate-Acrylonitrile Copolymer (copolymerization ratio: 78/22 (wt %), polymerization degree:900) | 26 parts |
| Polyisocyanate (same as Magnetic Coating Solution B) | 5 parts |
| Lecithin | 1 part |
| Oleic Acid | 1.5 part |
| Carbon Black (particle size: about 80 μm) | 7 parts |
| Butyl Acetate/Toluene (1/1 volume) Solvent Mixture | 300 parts |
| Magnetic Coating Solution D | |
| Magemite (γ-Fe₂O₃, Hc = 295 Oe, particle size: 0.03 × 0.03 × 0.5 μm) | 100 parts |
| Nitrocellulose (viscosity: RS 1/2, nitrogen content: 11.8 to 12.20, molecular weight: 30,000) | 10 parts |
| Polyether-type Polyurethane Prepolymer (the reaction product of 1,4-butylene glycol and toluene diisocyanate (1.3: 1.6 molar ratio), which has an —NCO group at the terminals thereof; molecular weight: 2,000) | 20 parts |
| Lecithin | 1 part |
| Amyl Stearate | 0.3 part |
| Carbon Black (particle size: about 50 μm) | 5 parts |
| Polyamine (4,4'-methylenebis-2-chloroaniline) | 2 parts |
| Butyl Acetate/Methyl Ethyl Ketone (1/1 volume) Solvent Mixture | 280 parts |

COMPARATIVE EXAMPLE 1

| Subbing Solution CI (concentration: 2 wt% solution) | |
| --- | --- |
| Amorphous Polyester Resin (terpolymer of terephthalic acid, ethylene glycol and triethylene glycol (1 : 1.8 : 0.5 molar ratio), softening point: 65° C.) | 97 parts |
| Polycarbonate Resin (bisphenol A type*, molecular weight: 40,000) | 3 parts |
| Methyl Ethyl Ketone/Cyclohexanone (9/1 volume) Solvent Mixture | 5000 parts |

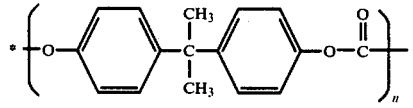

Subbing solution CI having the formulation described above was coated on a polyethylene terephthalate film (22 μm thick) as in Example 1, to a 0.4 μm by thickness followed by drying as in Example 1. Magnetic Coating Solution A was further coated thereon to a dry thickness of 8 μm, subjected to orientation treatment, and dried and slit in a ¼ width all as in Example 1. Thus, a magnetic tape was obtained, which was identified as Sample No. CI-A.

With respect to Sample Nos. I-A, I-B, I-C, I-D and CI-A, a friction pull test(stripping-off at an angle of 180°) was performed (JIS K6744-1963, ASTM D903-49(1965)), in which a cellophane adhesive tape (JIS Z1522) was uniformly adhered to the magnetic layer of each magnetic tape ¼ inch wide and the friction pull strength at an angle of 180° (g/cm) was measured at various temperatures using a TOM tensile testing machine. The results are shown in Table 1 below.

Table 1

| | Friction Pull Strength at 180° (g/cm) | | | | | |
| --- | --- | --- | --- | --- | --- | --- |
| Sample No. | −20° C. | −10° C. | 0° C. | 10° C. | 30° C. | 70° C. |
| I-A | 30 | 30 | 40 | 70 | 118 | 45 |
| I-B | 26 | 28 | 30 | 80 | 130 | 100 |
| I-C | 40 | 45 | 47 | 82 | 140 | 105 |
| I-D | 24 | 25 | 30 | 53 | 109 | 80 |
| CI-A | 2 | 8 | 13 | 40 | 84 | 78 |

It can be seen from the results above that the samples obtained in accordance with Example 1 (Sample Nos. I-A, I-B, I-C and I-D) had a good 180° friction pull strength, that is, good adhesive property, whereas the sample obtained in accordance with Comparative Example 1 (Sample No. CI-A) showed a poor adhesive property as a whole, in particular, a poor adhesive property at low temperature.

EXAMPLE 2

A subbing layer having a dry thickness of 0.4 μm was formed as in Example 1 except that the ratios of the amorphous linear polyester and the vinylidene-acrylonitrile copolymer of Subbing Solution I used Example 1 were modified as indicated in Table 2 below.

Table 2

| Subbing Solution Nos. (concentration: 2 wt%) | Polyester/Copolymer (wt%) |
|---|---|
| II | 100/0 |
| III | 100/10 |
| IV | 100/20 |
| V | 100/30 |
| VI | 100/70 |
| VII | 0/100 |

Onto each of these subbing layers, Magnetic Coating Solution C was uniformly coated in a dry thickness of 10 μm. After orientation at a direct current magnetic field of 1500 Causs and then drying at 90° C. for 8 mins. at an air flow of 2.5 kl/m²/sec., the films were slit to a ¼ inch width. Magnetic tapes were thus obtained which are identified as Sample Nos. II-C, III-C, IV-C, V-C, VI-C and VII-C.

The friction pull strength at an angle of 180° of each of the samples was measured at 25° C. as in Example 1, the results of which are shown in Table 3 below.

Table 3

| Sample Nos. | Friction Pull Strength at 180° (25° C.) (g/cm) |
|---|---|
| II-C | 46 |
| III-C | 98 |
| IV-C | 120 |
| V-C | 116 |
| VI-C | 49 |
| VII-C | 38 |

It can be seen from the results above that Sample Nos. II-C, VI-C and VII-C were considerably inferior to Sample Nos. III-C, IV-C and V-C; good results were obtained when the ratio of the vinylidene chloride-acrylonitrile copolymer incorporated in the amorphous linear polyester resin was 10 to 50 wt%.

EXAMPLE 3

| Subbing Solution VIII (concentration: about 3 wt% solution) | |
|---|---|
| Amorphous Linear Saturated Polyester (terpolymer of terephthalic acid, ethylene glycol and triethylene glycol (1:2:0.4 molar ratio), average molecular weight:19,000, softening point: 120° C., solubility parameter: 9.1) | 85 parts |
| Vinylidene Chloride-Acrylonitrile Copolymer (nitrogen content: 1.5%, specific viscosity (25° C., 1 wt% tetrahydrofuran solution): 1.5) | 15 parts |
| Methyl Ethyl Ketone/Tetrahydrofuran (8/2 volume) Solvent Mixture | 3000 parts |

Subbing Solution VIII described above was uniformly coated onto a polyethylene terephthalate film (having a thickness of 36 μm) in a dry thickness of 1.5 μm. After drying at 85° C. for 5 secs. at an air flow of 2.5 kl/m²/sec., Magnetic Coating Solution A (see Example 1) was further coated thereon in a dry thickness of 8 μm, and subjected to orientation at a direct current magnetic field of 1500 Gauss, followed by drying at 90° to 95° C. for 3 mins. at an air flow of 3 kl/m²/sec. The film thus obtained was slit into a ¼ inch width. A magnetic tape was obtained which was identified as Sample VIII-A.

COMPARATIVE EXAMPLE 2

| Subbing Solution CII (concentration: about 3 wt% solution) | |
|---|---|
| Amorphous Linear Saturated Polyester (same as in Subbing Solution VIII) | 85 parts |
| Vinyl Chloride-Vinyl Acetate Copolymer (copolymerization ratio: 87/13 (wt %), polymerization degree: 420) | 15 parts |
| Methyl Ethyl Ketone/Tetrahydrofuran (8/2 volume) Solvent Mixture | 3000 parts |

A magnetic tape was prepared using Subbing Solution C II described above as in Example 3, which was identified as Sample C II-A

COMPARATIVE EXAMPLE 3

| Subbing Solution C III (concentration: about 3 wt% solution) | |
|---|---|
| Amorphous Linear Polyester (same as in Example 3) | 85 parts |
| Epoxy Resin (the reaction product of epichlorohydrin and diphenyl propane, epoxy equivalent: 470, molecular weight: 1,000 "Epikote 1001", trade name, produced by Shell Chemical Co., Ltd.) | 15 parts |
| Methyl Ethyl Ketone/Tetrahydrofuran (8/2 volume) Solvent Mixture | 3000 parts |

A magnetic tape was prepared using Subbing Solution C III described above as in Example 3, which was identified as Sample C III-A.

COMPARATIVE EXAMPLE 4

| Subbing Solution C IV (concentration: about 3 wt% solution) | |
|---|---|
| Amorphous Linear Polyester (same as in Example 3) | 85 parts |
| Straight Chain Polyurethane (terpolymer of adipic acid, 1,4-butanediol and diisocyanate (1:1:0.2 molar ratio) molecular weight: 36,000) | 15 parts |
| Methyl Ethyl Ketone/Tetrahydrofuran (8/2 volume) Solvent Mixture | 3000 parts |

A magnetic tape was prepared using Subbing Solution C IV as in Example 3 which was identified as Sample C IV-A.

With respect to Samples VIII-A, C II-A, C III-A and C IV-A obtained in accordance with Example 3, and Comparative Examples 2, 3 and 4, the friction pull strength (g/cm) at an angle of 180° was measured at various temperature, the results of which are shown in Table 4 below. The measurement was performed as in Example 1.

Table 4

| Sample Nos. | Friction Pull Strength at 180° (g/cm) | | | | | |
|---|---|---|---|---|---|---|
| | −20° C. | −10° C. | 0° C. | 10° C. | 30° C. | 70° C. |
| VIII-A | 30 | 33 | 40 | 77 | 120 | 60 |
| C II-A | 2 | 3 | 15 | 53 | 40 | 60 |
| C III-A | 2 | 8 | 10 | 35 | 55 | 70 |

Table 4-continued

| Sample Nos. | Friction Pull Strength at 180° (g/cm) | | | | | |
|---|---|---|---|---|---|---|
| | −20° C. | −10° C. | 0° C. | 10° C. | 30° C. | 70° C. |
| C IV-A | 8 | 6 | 18 | 30 | 60 | 57 |

As can be seen from the results above, Sample VIII-A had a stable adhesive strength as in Samples I-A, I-B, I-C and I-D, without a remarkable decrease in adhesive property at a temperature range of from −20° C. to 70° C. On the other hand, Samples C II-A, C III-A and C IV-A showed a poor adhesive strength, of 40 to 60 g/cm, even at room temperature (30° C.), which was ½ that of Sample VIII-A. In particular, the adhesive strength of Sample C III-A was abnormally low at low temperatures (−20° C. to 0° C.), i.e., 2 to 10 g/cm; thus, good adhesive strength as observed in the subbing layers obtained in accordance with the present invention could not be obtained.

From these results it was confirmed that the composition of the subbing layer in accordance with the present invention, i.e., the two component mixture of an amorphous linear saturated polyester and a vinylidene chloride-an addition polymerizable nitrile copolymer, possesses extremely superior characteristics as compared to an amorphous linear saturated polyester and another resin.

COMPARATIVE EXAMPLE 5

| Subbing Solution C V (concentration: about 5.3 wt% solution) | |
|---|---|
| Vinylidene Chloride-Acrylonitrile Copolymer (same as in Example 1) | 15 parts |
| Polyester Resin ("Desmophen 2200", tradename, made by Bayer A.G.: the reaction product of adipic acid, diethylene glycol and triol, viscous liquid at normal temperature (25° C.), viscosity (75° C.): about 1000 cp) | 35 parts |
| Palmitic Acid | 0.5 part |
| Methyl Ethyl Ketone | 190 parts |
| Methyl Isobutyl Ketone | 380 parts |
| Toluene | 380 parts |

Subbing Solution C V described above was prepared, but a white turbid solution was obtained. The subbing solution thus obtained was coated onto a polyethylene terephthalate film (having a thickness of 23 μm) in a dry thickness of 1.5 μm. The coated layer was dried at 90° C. for 10 secs. at an air flow of 2.5 kl/cm²/sec. However, this subbing layer C V was uneven in thickness and tackiness remained at the thickly coated portions, which resulted in adherence around a pass roll upon winding up. The film was not suitable for overall production of a tape.

On the other hand, it was found that in case that an amorphous linear saturated polyester resin including an aromatic dicarboxylic acid as was used in Examples 1, 2 and 3 of the present invention was used in the subbing layer, such as tackiness problem as in the aforementioned subbing layer CV was not observed, and the amorphous linear saturated polyester was suitable for use in a subbing layer for a magnetic tape.

COMPARATIVE EXAMPLE 6

| Subbing Solution C VI (concentration: about 5.3 wt% solution) | |
|---|---|
| Vinylidene Chloride-Acrylonitrile Copolymer (same as in Example 1) | 15 parts |
| Polyurethane Resin (Desmocoll 176, tradename, made by Bayer A.G., polyester polyurethane containing about 0.1% of —OH groups specific gravity (20° C.): 1.23 g/cm², solution viscosity (20° C., 15 wt % methyl ethyl ketone solution): 2–8 poise) | 35 parts |
| Palmitic Acid | 0.5 parts |
| Methyl Ethyl Ketone | 190 parts |
| Methyl Isobutyl Ketone | 380 parts |
| Toluene | 380 parts |

The aforementioned Subbing Solution C VI was coated onto a polyethylene terephthalate film (having a thickness of 21 μm) in a dry thickness of 1.5 μm. The coated layer was dried at 90° C. for 10 secs. at an air flow of 2.5 kl/m²/sec. Magnetic Coating Solution A was further coated on the subbing layer C VI in a dry thickness of 4 μm. Repellency of the magnetic coating solution was observed so that a uniform magnetic recording layer was not obtained.

On the other hand, the aforementioned repellency was not observed in case of Subbing Solution I, II and III of Examples 1, 2 and 3.

In addition, a similar repellency was observed with the composition in which palmitic acid was omitted from the aforementioned Subbing Solution C VI.

It was thus confirmed from the results above that coating of a magnetic coating solution is not good with a subbing solution composition comprising a vinylidene chloride-acrylonitrile copolymer and a polyurethane resin having further incorporated therein a higher fatty acid such as palmitic acid and comprising the same components (but not having incorporated therein a higher fatty acid such as palmitic acid) as compared to the present invention, so that a smooth surface of a magnetic recording layer was not obtained.

While the invention has been described in detail and with reference to specific embodiments thereof, it will be apparent to one skilled in the art that various changes and modifications can be made therein without departing from the spirit and scope thereof.

What is claimed is:

1. A process of producing a magnetic recording element comprising a non-magnetic support having provided thereon a subbing layer and further provided thereon a magnetic layer comprising ferromagnetic powders and a binder, which comprises coating a subbing solution at a temperature of 100° C. or below in a dry thickness of about 0.03 to about 2.0 μm, drying the coated layer and then coating the magnetic recording layer thereon, said non-magnetic support being a biaxially stretched polyester, and said subbing solution having a solids concentration of about 0.8 to 5 wt% and comprising
    (a) an amorphous linear saturated polyester resin prepared from an aromatic dicarboxylic acid and a glycol in a molar ratio of aromatic dicarboxylic acid to glycol of 1:2 to 1:3,
    (b) a vinylidene chloride-acrylonitrile copolymer or a vinylidene chloride-methacrylonitrile copolymer, each having a nitrogen content of about 1 to 6%, said copolymer being present in an amount of about 10 to about 50 wt % to said polyester resin, and (c) an organic solvent mainly composed of about 50 to about 100% by weight methyl ethyl ketone based on the total weight of organic solvent.

2. The process of claim 1, wherein said subbing solution consists essentially of said polyester, said vinylidene chloride copolymer and said solvent.

3. The process as claimed in claim 1, wherein said organic solvent includes at least one member selected from the group consisting of ketone type solvents other than methyl ethyl ketone, ester type solvents, ether or glycol ether type solvents and tar type solvents in an amount of up to about 50 wt% of said organic solvent.

4. The process as claimed in claim 1, wherein said dry thickness is 0.2 to 1.5 $\mu$m.

5. The process as claimed in claim 1, wherein an amount of about 5 mole % or less of said aromatic dicarboxylic acid is replaced by other dicarboxylic acids having less than 13 carbon atoms and selected from the group consisting of aliphatic saturated dicarboxylic acids, aliphatic unsaturated dicarboxylic acids and oxydicarboxylic acids.

6. The process as claimed in claim 1, wherein said aromatic dicarboxylic acid has from about 8 to about 18 carbon atoms, and said glycol has about 2 to about 10 carbon atoms.

7. The process as claimed in claim 1, wherein said coating of the subbing layer is under drying conditions of
(i) a temperature of less than about 100° C.,
(ii) an air flow of about 1 to about 5 kl/m$^2$/sec, and
(iii) for a period of about 2 to about 10 seconds.

* * * * *